US012761394B2

United States Patent
(12) United States Patent
Gudipati et al.

(10) Patent No.: US 12,761,394 B2
(45) Date of Patent: Oct. 13, 2026

(54) DETERMINING DOWNHOLE OPERATION TRANSITIONS FROM WELLBORE MEASUREMENT DATA USING MACHINE LEARNING

(71) Applicant: Schlumberger Technology Corporation, Sugar Land, TX (US)

(72) Inventors: Mallikarjuna Rao Gudipati, Pune (IN); Kjetil Westre, Tananger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 320 days.

(21) Appl. No.: 18/442,429

(22) Filed: Feb. 15, 2024

(65) Prior Publication Data

US 2025/0264634 A1 Aug. 21, 2025

(51) Int. Cl.

| | |
|---|---|
| ***G01V 99/00*** | (2024.01) |
| ***E21B 41/00*** | (2006.01) |
| ***E21B 47/00*** | (2012.01) |
| ***G06N 20/00*** | (2019.01) |

(52) U.S. Cl.

CPC .............. *G01V 99/00* (2013.01); *E21B 41/00* (2013.01); *E21B 47/00* (2013.01); *G06N 20/00* (2019.01); *E21B 2200/22* (2020.05)

(58) Field of Classification Search

CPC ......... G01V 99/00; E21B 41/00; E21B 47/00; E21B 2200/22; G06N 20/00

See application file for complete search history.

(56) References Cited

U.S. PATENT DOCUMENTS

| | | | | |
|---|---|---|---|---|
| 11,473,407 | B2 | 10/2022 | Tang et al. | |
| 2010/0023269 | A1* | 1/2010 | Yusti | E21B 43/00 702/12 |
| 2018/0320512 | A1* | 11/2018 | Anisur Rahman | E21B 49/00 |
| 2019/0390545 | A1* | 12/2019 | Poe, Jr. | E21B 47/10 |
| 2020/0378236 | A1* | 12/2020 | Brumbaugh | E21B 44/02 |
| 2023/0068373 | A1* | 3/2023 | Zhang | G06F 18/211 |

FOREIGN PATENT DOCUMENTS

| | | |
|---|---|---|
| WO | 2017053347 A1 | 3/2017 |

OTHER PUBLICATIONS

Search Report and Written Opinion of International Patent Application No. PCT/US2024/016189 dated Oct. 1, 2024, 10 Pages.

* cited by examiner

*Primary Examiner* — Manuel A Rivera Vargas
(74) *Attorney, Agent, or Firm* — Kyle R. Miiller

(57) ABSTRACT

This application relates to a downhole system that uses a transition detection system to determine transitions between downhole activities or operations for a wellbore based on wellbore measurement data. In various implementations, the transition detection system uses a transition identification machine learning model to generate downhole transition types between downhole operations from wellbore measurement data. Additionally, the transition detection system identifies errors and inaccuracies with activity transitions reported in a downhole operation report based on comparing the downhole operation report to the determined transition times generated by the transition identification machine learning model.

13 Claims, 11 Drawing Sheets

DETERMINING DOWNHOLE OPERATION TRANSITIONS FROM WELLBORE MEASUREMENT DATA USING MACHINE LEARNING

BACKGROUND

In oil and gas operations, a wellbore may be drilled to access fluids, such as liquid and gaseous hydrocarbons, stored in subterranean formations and to extract the fluids from the formations. Wellbores are created using earth-boring tools for drilling wellbores and enlarging the diameters of wellbores. In connection with creating and using wellbores, drilling operation systems collect measurement data and reports associated with the wellbores.

To elaborate, operation reports are generated to document the various activities performed as part of a drilling operation, such as drilling, cementing, tripping, or circulating drilling fluid, among other activities. These activities are recorded in the operation report, including a time signature for each activity, and may generally be reported manually. Drilling operations may typically involve a significant number of activities (and transitions therebetween), and in some instances, operations reports are not created or completed until many activities have been initiated and/or completed. Thus, in some cases, the time signatures recorded in the report do not accurately reflect the timing of the associated activity. This may result in any number of issues such as inaccurate analyses of the drilling operation, mismanagement of resources, contractual disputes, compliance issues, etc.

Conventionally, time signature discrepancies are corrected by drilling personnel manually reviewing wellbore measurement data from the downhole operation, for example, in order to identify the correct timing of the activities and manually correct the times in the operation reports. This manual process is not only inefficient, costly, and labor intensive, but is also prone to inaccuracies such as due to human error and fatigue. Thus, improved techniques for identifying errors in operation report time signatures may be advantageous.

BRIEF DESCRIPTION OF THE DRAWINGS

The following detailed description provides specific and detailed implementations accompanied by drawings. Additionally, each of the figures listed below corresponds to one or more implementations discussed in this disclosure in which.

DETAILED DESCRIPTION

Figure 1:
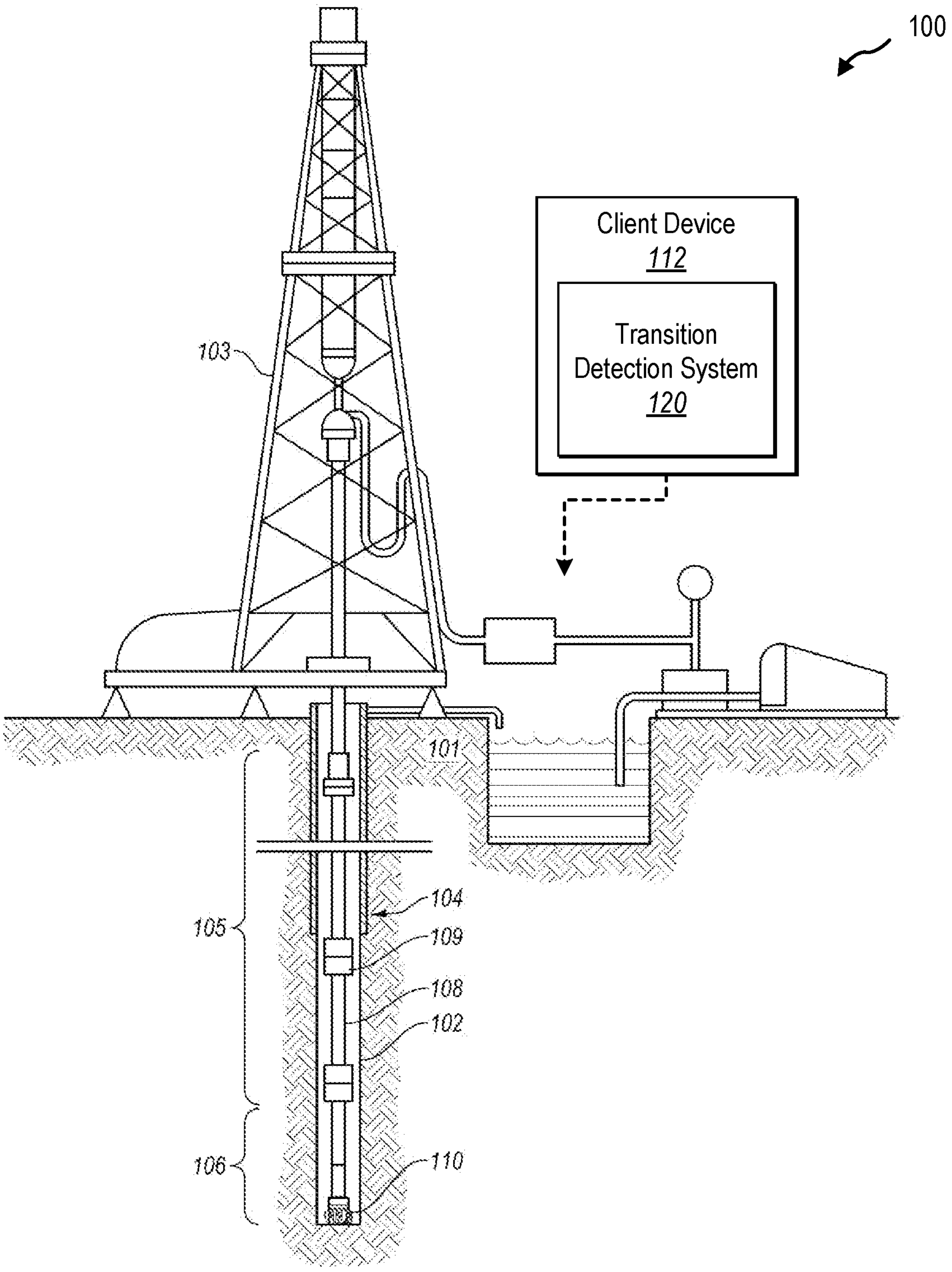
FIG. 1 is an example of a downhole system, according to at least one embodiment of the present disclosure.

This disclosure generally relates to using a transition detection system to determine transitions between downhole activities or operations for a wellbore using machine learning models based on wellbore measurement data. In various implementations, the transition detection system uses a transition identification machine learning model to efficiently and accurately generate estimated transition types of downhole transition from wellbore measurement data for the downhole operation(s). Additionally, the transition detection system may identify errors or inaccuracies with activity transitions reported in a downhole operation report based on comparing the downhole operation report to estimated transition times output by the transition identification machine learning model.

According to various implementations, the transition detection system receives wellbore data for a particular wellbore or operation of interest. The transition detection system delineates or segments the wellbore measurement data (e.g., time-series measurement data) by establishing various time points spanning the duration of the wellbore measurement data. For each time point, the transition detection system generates a time window around the time point, with time window portions both before and after the time point. Based on the underlying wellbore measurement data bounded within the time windows for each time point, the transition detection system generates a set of statistical attributes for the time windows and associates these statistical attributes with the time point.

In one or more embodiments, the transition detection system implements a transition identification machine learning model to predict when, and what type of, downhole operation transitions occurred during the period for which the wellbore measurement data was taken. Based on the statistical attribute sets, the transition identification machine learning model evaluates each time point to estimate the type of transition occurred around that time point, if any. In one example, the transition identification machine learning model is a tree-based model and may process the statistical attribute sets through one or more decision trees to classify transition types. In this way, the transition detection system may identify when a downhole operation transition occurs and the transition type between downhole operations.

In some implementations, the transition detection system may compare these results to a series of activity transitions and associated time signatures documented in a downhole operation report. The transition detection system may identify one or more instances where the downhole operation reports does not match the estimated transition types. In some implementations, the transition detection system may automatically update the downhole operation report with corrected activity transitions and/or time signatures, or the transition detection system may flag or indicate discrepancies to a drilling engineer.

As will be discussed in further detail below, the present disclosure includes a number of practical applications having features described herein that provide benefits and/or solve problems associated with identifying downhole operation transitions. Some example benefits are discussed herein in connection with various features and functionalities provided by a transition detection system implemented on one or more computing devices. It will be appreciated that benefits explicitly discussed in connection with one or more embodiments described herein are provided by way of example and are not intended to be an exhaustive list of all possible benefits of the transition detection system.

For example, the transition detection system described herein improves the accuracy of reported downhole operation transitions, including downhole operation transition types and downhole operation transition times. For instance, downhole operation reports often include errors with respect to downhole operation transitions, which often is the result of incorrect inputs. By determining downhole activity transitions based on measured data from associated downhole operations, the transition detection system accurately determines transition types and times between downhole activities.

As mentioned earlier, the transition detection system implements a transition identification machine learning model to determine transition types between downhole operations based on wellbore measurement data. To improve accuracy and efficiency, the transition identification machine learning model generates one or more statistical attribute sets from the wellbore measurement data, which is provided as input to the transition identification machine learning model (rather than providing the raw, underlying time-series measurement data). Because the statistical attribute sets characterize statistical features, calculations, or other attributes for segmented sections of the measurement data, the transition identification machine learning model more efficiently classifies transition types as well as generates more accurate operation type classifications. Indeed, using statistical attribute sets enables the transition identification machine learning model to operate in a more streamlined and computationally efficient process to predict the transition types based on the measurement data.

Further, the transition detection system may be implemented to identify instances where the downhole operation reports identify activity transitions and/or time signatures that differ from what the transition identification machine learning model determined. The transition detection system may automatically correct, flag, or otherwise indicate these instances for review. For example, the transition detection system may generate updated downhole operation reports with one or more activity transitions and/or time signatures corrected.

Furthermore, the transition detection system may quickly and automatically identify or correct errors in the downhole operation reports that may otherwise require significant time and resources to remedy. This enables scaling operations that were previously bottlenecked with manual user-review. For example, wellbore measurement data has typically been reviewed manually to ensure that the reports agree with the measurements observed in the wellbore. Flagging inconsistencies for review, or in some cases automatically correcting discrepancies, provides significant resource savings, as well as improved accuracy.

As illustrated in the foregoing discussion, this disclosure utilizes a variety of terms to describe the features and advantages of one or more implementations described. To illustrate, this disclosure describes the transition detection system in the context of a drilling operations system.

As used herein, "wellbore measurement data," "wellbore data," "measurement data" and the like may refer to data which each describe an aspect, value, rate, property, state, etc. of a downhole operation. For example, the wellbore data includes time-series measurements of drilling parameters such as a flow rate, temperature, pressure, speed, torque (TOR), rate of penetration (ROP), and weight on bit (WOB). The wellbore measurement data (e.g., time-series measurement data) may include measurements of formation evaluation, wellbore stability, mud properties, survey data, and equipment health and status. Indeed, the measurement data may include any measurement, metric, or value relevant to a downhole operation, and combinations thereof. The wellbore measurement data may include measurements taken from various downhole and/or surface sensors and/or measurements received from one or more computing devices. The data may be time-series data and may be taken periodically (e.g., continuously) throughout a downhole operation such that the measurement data captures a portion or an entirety of the downhole operation. The wellbore measurement data may include information for characterizing and/or describing any aspect of a wellbore operation. In some cases, the wellbore measurement data may include a limited number, predetermined standardized set, or fixed default set of measurement data types for a set of wellbores.

As used herein, "downhole operation reports," "operation reports," "downhole reports" and the like may refer to data contained or documented within an operation report or log for a downhole operation. For example, the downhole operation reports may document the various activities that are performed during or in pursuit of one or more downhole operations, including transitions between activities or operations. The reports may document relevant time signatures for the downhole operation, such as start and/or end times for various activities or times of transitions between activities. In some cases, the downhole reports may be generated manually, such as by a drilling engineer observing activities at a drilling site. The operation reports may be generated while downhole (e.g., drilling) activities are being conducted, or may be generated after the completion of one or more activities such as part of a review of one or more downhole activities.

As used herein, "downhole operation," "downhole activity" and the like may refer to any process, activity, objective, or action that takes place in, around, or with respect to a wellbore. These activities may include drilling, cementing, tripping, mud circulation, logging, completion activities, or any other activity relevant to, or in pursuit of, creating, lengthening, or otherwise operating a wellbore.

As described herein, various downhole operations and activities may occur within a wellbore, and "downhole transitions," "downhole operation transitions," or "transitions" and the like may occur between downhole operations as different stages of the wellbore are reached or carried out. These transitions may manifest through various measurements taken during the downhole operations and transitions.

The term "machine-learning model" refers to a computer model or computer representation that may be trained (e.g., optimized) based on inputs to approximate unknown functions. For instance, a machine-learning model may include, but is not limited to, a neural network (e.g., a convolutional neural network (CNN), LSTM, graph neural network, or deep learning model), a decision tree (e.g., a gradient-boosted decision tree), a linear regression model, a logistic regression model, Dirichlet allocation (LDA) model, multi-arm bandit model, random forest model, support vector machine (SVM) model, or a combination of these models.

Additional terms are defined throughout the disclosure in connection with various examples and contexts.

Additional details will now be provided regarding systems described herein in relation to illustrative figures portraying example implementations. For example, FIG. 1 shows one example of a downhole system 100 for drilling an earth formation 101 to form a wellbore 102. The downhole system 100 includes a drill rig 103 used to turn a drilling tool assembly 104 which extends downward into the wellbore 102. The drilling tool assembly 104 may include a drill string 105, a bottomhole assembly ("BHA") 106, and a bit 110, attached to the downhole end of the drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 further includes additional downhole drilling tools and/or components. The drill pipe 108 provides a hydraulic passage through which drilling fluid is pumped from the surface to the bit 110.

The BHA 106 may include other downhole drilling tools and components. Examples of additional BHA components include measurement-while-drilling ("MWD") tools, logging-while-drilling ("LWD") tools, and measurement sensors.

To elaborate, while performing downhole (e.g., drilling) activities, wellbore measurement data may be taken, measured, or observed through a variety of (e.g., downhole and/or surface) sensors. In this way, various information may be collected related to the wellbore and/or downhole activity in order to facilitate the techniques described herein. Additionally, in some cases, reports or logs may be generated for documenting various downhole activities or operations. These reports may indicate an operation type and time signature for various operations or activities (and/or transition between operations or activities) and may be generated manually by drilling personnel.

The downhole system 100 may include or may be associated with a client device 112 that implements a transition detection system 120 (e.g., implemented on a single client device, a server device,, or across multiple computing devices). The transition detection system 120 may facilitate determining wellbore operation transitions for the wellbore 102, including identifying and/or correcting one or more incorrect time signatures of an operational report.

Figure 2A:
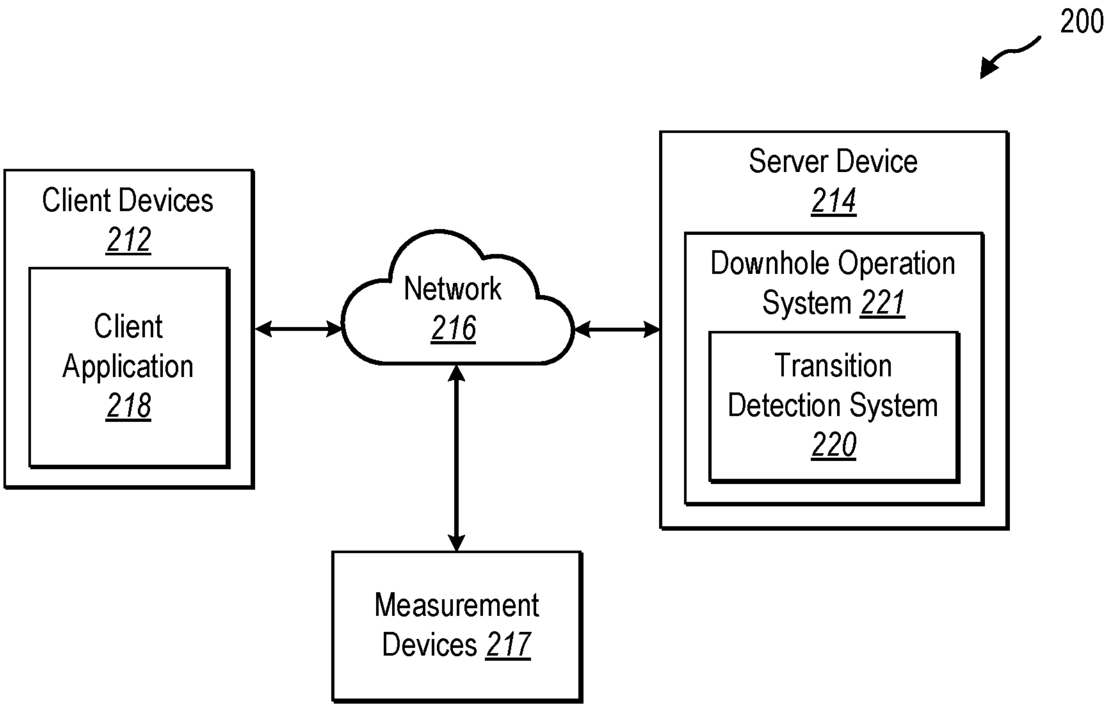
FIG. 2A illustrates an example environment in which a transition detection system is implemented, according to at least one embodiment of the present disclosure.

FIG. 2A illustrates an example environment 200 in which a transition detection system 220 is implemented in accordance with one or more embodiments described herein. As shown in FIG. 2A, the environment 200 includes a server device 214 representing one or more computing devices (e.g., including processing units, data storage, etc.).

As shown in FIG. 2A, the environment 200 includes a downhole operation system 221 implemented on the server device 214. The downhole operation system 221 may include software and/or hardware for implementing and/or performing one or more of the functions of a downhole system, such as the downhole system 100 of FIG. 1.

In some implementations, the downhole operation system 221 on the server device 214 implements a transition detection system 220. While shown on the server device 214, the transition detection system 220 may be implemented wholly or in part on the client device 212, across the server device 214 and the client device 212, or on or across one or more additional devices, such that different portions or components of the transition detection system 220 are implemented on different computing devices in the environment 200. Additional details regarding the transition detection system 220 are provided below in connection with FIG. 2B.

As shown in FIG. 2A, the server device 214 may communicate with a client device 212 through a network 216. The network 216 may include one or multiple networks and may use one or more communication platforms and/or technologies suitable for transmitting data. The network 216 may refer to any data link that enables the transport of electronic data between devices of the environment 200. The network 216 may refer to a hardwired network, a wireless network, or a combination of a hardwired network and a wireless network. In one or more embodiments, the network 216 includes the internet. The network 216 may be configured to facilitate communication between the various computing devices via well-site information transfer standard markup language (WITSML) or similar protocol, or any other protocol or form of communication.

The client device 212 may represent one or multiple computing devices, including different types of computing devices. For example, the client device 212 represents a mobile device such as a mobile telephone, a smartphone, a personal digital assistant (PDA), a tablet, a laptop, or any other portable device. Additionally, or alternatively, the client device 212 represents a non-mobile device such as a desktop computer, server device, surface or downhole processor or computer (e.g., associated with a sensor, system, or function of the downhole system), or another non-portable device.

In one or more implementations, the client device 212 includes a graphical user interface (GUI) thereon (e.g., a screen of a mobile device). In addition, or as an alternative, the client device 212 may be communicatively coupled (e.g., wired or wirelessly) to a display device having a graphical user interface thereon for providing a display of system content. The server device 214 may similarly refer to various types of computing devices. Each of the devices of the environment 200 may include features and/or functionalities described below in connection with FIG. 6.

The client device 212 may include a client application 218. The client application 218 may include an application or interface for interacting with and/or receiving the features of the transition detection system 220 as described herein. In some embodiments, one or more of the functions or features of the transition detection system 220 may be carried out or performed on or by the client application 218.

The environment 200 also includes measurement devices 217. The measurement devices 217 may include sensor devices, such as downhole and/or surface sensors, or other downhole measurement devices for taking and providing measurements to the transition detection system 220. For example, the wellbore measurement data (e.g., time-series measurement data) and/or the downhole operation reports may be received and made accessible to the computing devices of the environment 200 via the measurement devices 217.

Figure 2B:
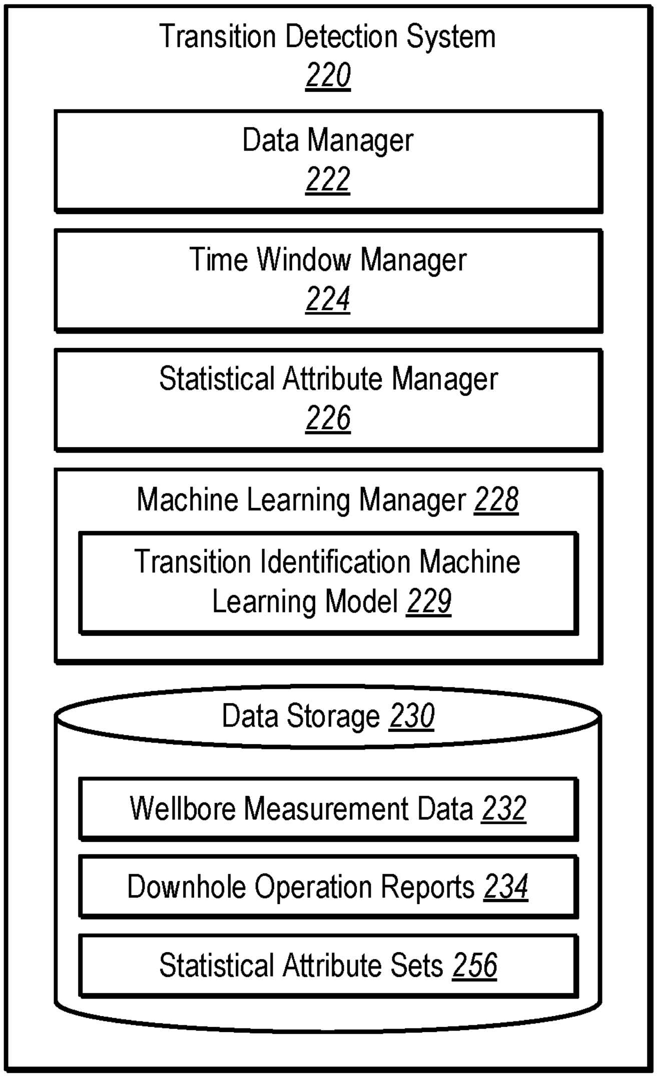
FIG. 2B illustrates an example implementation of a transition detection system as described herein, according to at least one embodiment of the present disclosure.

FIG. 2B illustrates an example implementation of the transition detection system 220 according to at least one embodiment of the present disclosure. As illustrated, the transition detection system 220 includes various components and elements that are implemented in hardware and/or software. For example, the transition detection system 220 includes a data manager 222, a time window manager 224, a statistical attribute manager 226, and a machine learning manager 228, which may implement a transition identification machine learning model 229. The transition detection system 220 may also include a data storage 230 having wellbore measurement data 232, downhole operation reports 234, and statistical attribute sets 256.

The data manager 222 of the transition detection system 220 may receive, collect, or otherwise access a variety of types of data. For example, the data manager 222 may collect, compile, store, and/or manage the various data of the data storage 230. In some embodiments, the data manager 222 may receive and/or initiate requests of the transition detection system 220 to identify downhole operation transitions within a set of wellbore measurement data as described herein.

In various embodiments, the time window manager 224 may facilitate generating time windows or time intervals for the wellbore measurement data 232. The time window manager 224 may generate time windows for specific time points within the wellbore measurement data 232. Based on the time windows, the statistical attribute manager 226 may determine a set of statistical attributes for each of the time windows. In this way, the statistical attribute set for the various time windows may be provided to the transition identification machine learning model 229 for training and/or executing the model.

Figure 3A:
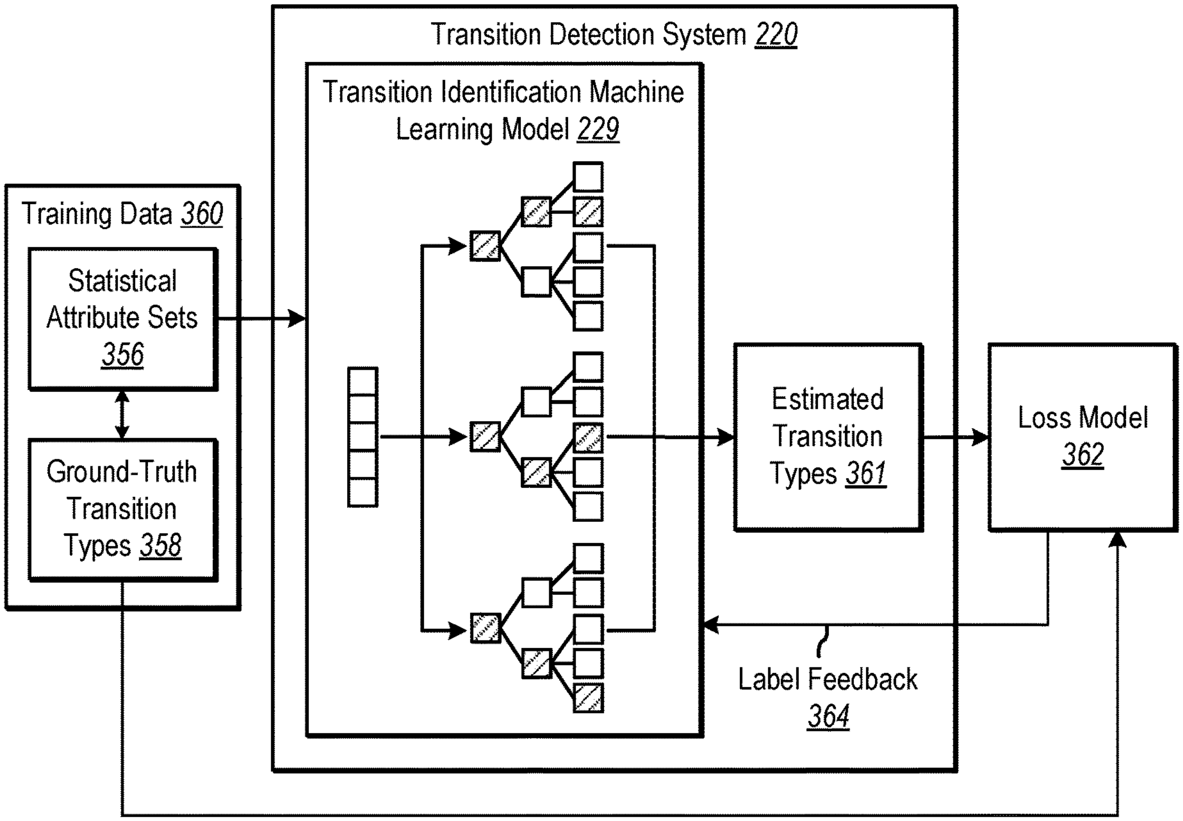
FIG. 3A illustrates an example block diagram of training a transition identification machine learning model to determine transition types for transitions between downhole activities, according to at least one embodiment of the present disclosure.
Figure 3B:
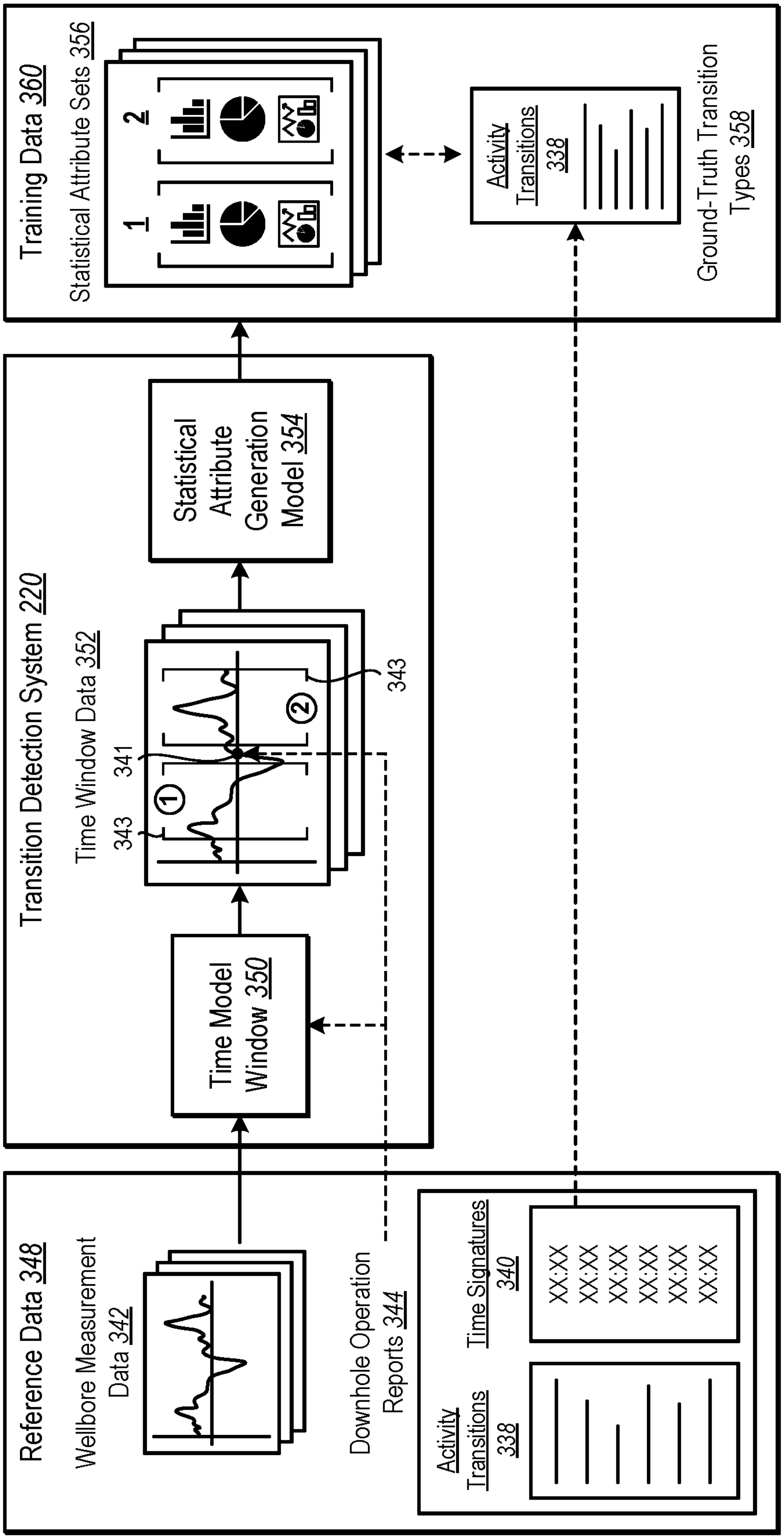
FIG. 3B illustrates an example block diagram of generating training data from reference data, according to at least one embodiment of the present disclosure.

The machine learning manager 228 may facilitate training the transition identification machine learning model 229 based on the statistical attribute sets generated from the wellbore measurement data 232 along with associated transition times indicated in the downhole operation reports 234. FIGS. 3A and 3B illustrate the training of the transition identification machine learning model 229, including the generation of training data.

Figure 4A:
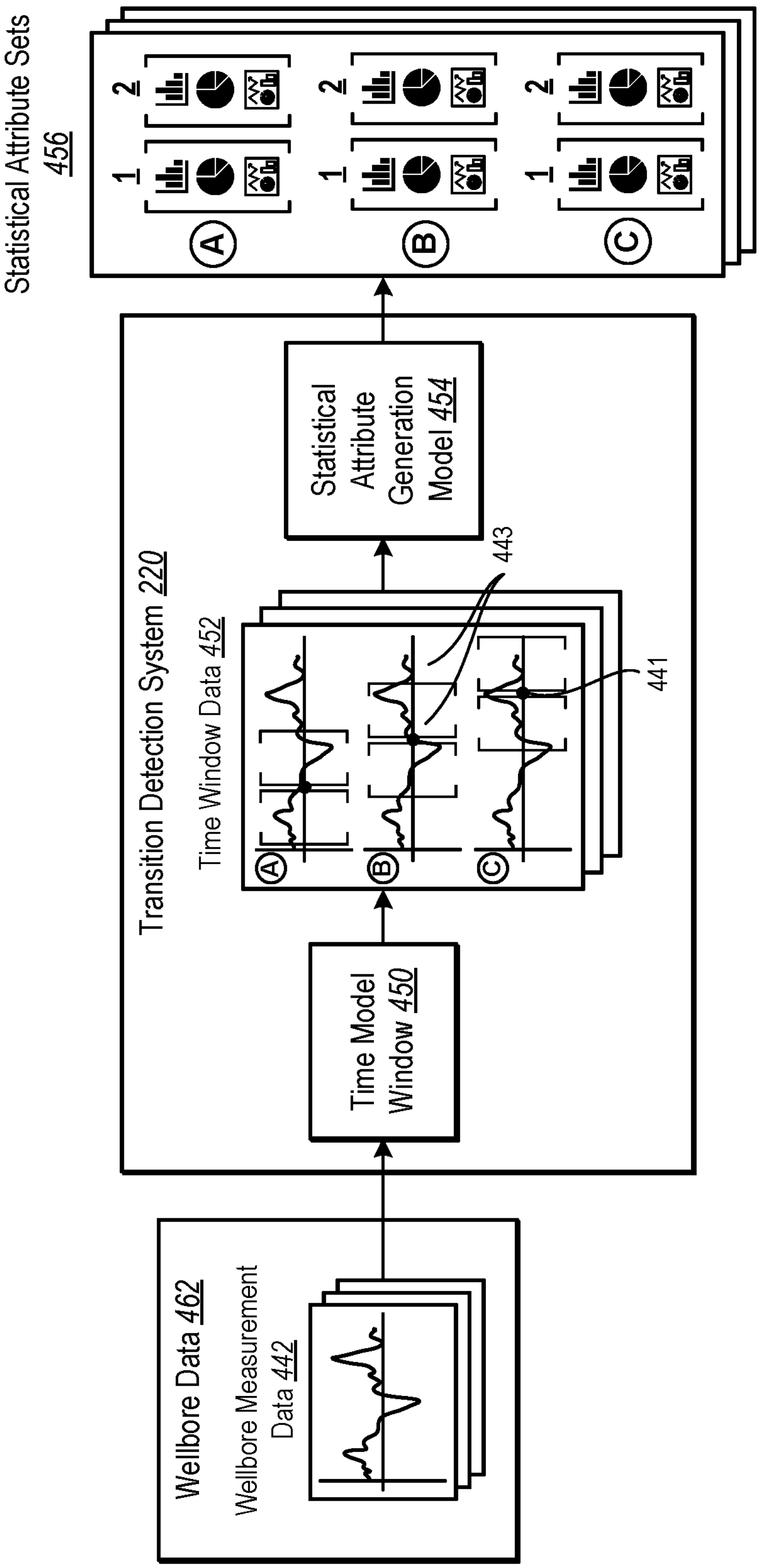
FIG. 4A illustrates an example block diagram of generating input data from sample data for applying to a transition identification machine learning model according to various implementations.
Figure 4B:
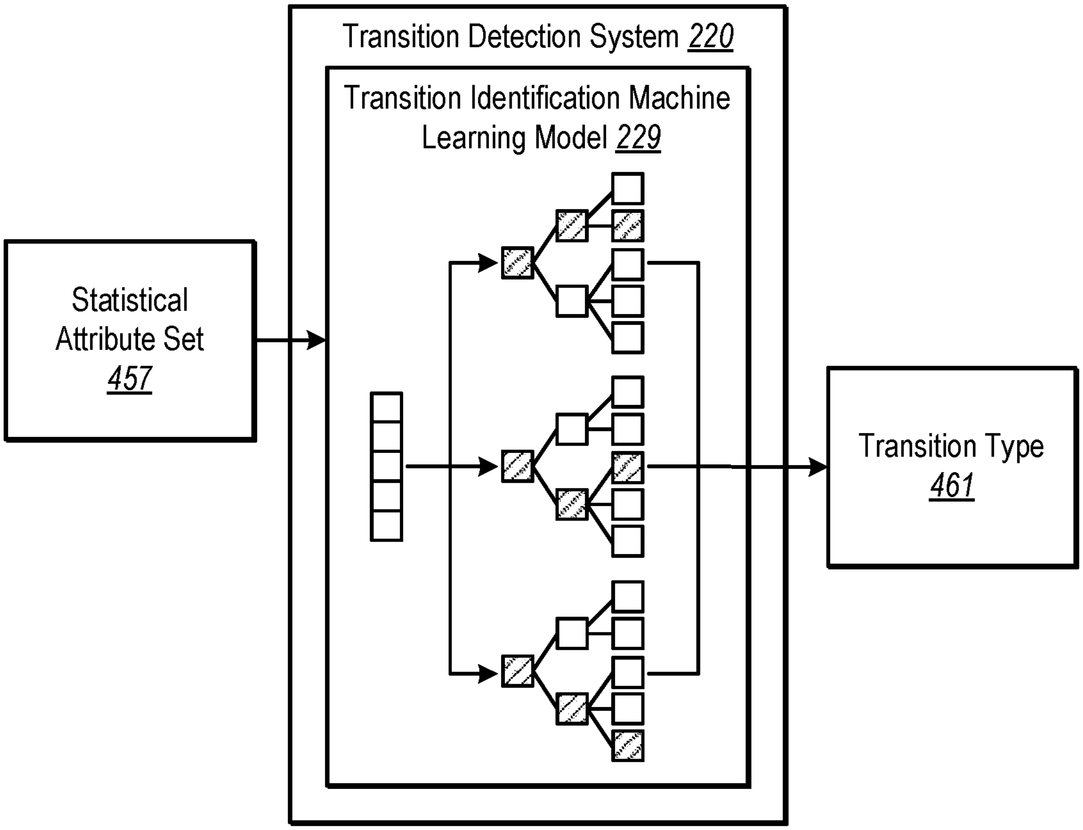
FIGS. 4B-4C illustrate example block diagrams of using a transition detection system to generate estimated transition times according to some embodiments.
Figure 4C:
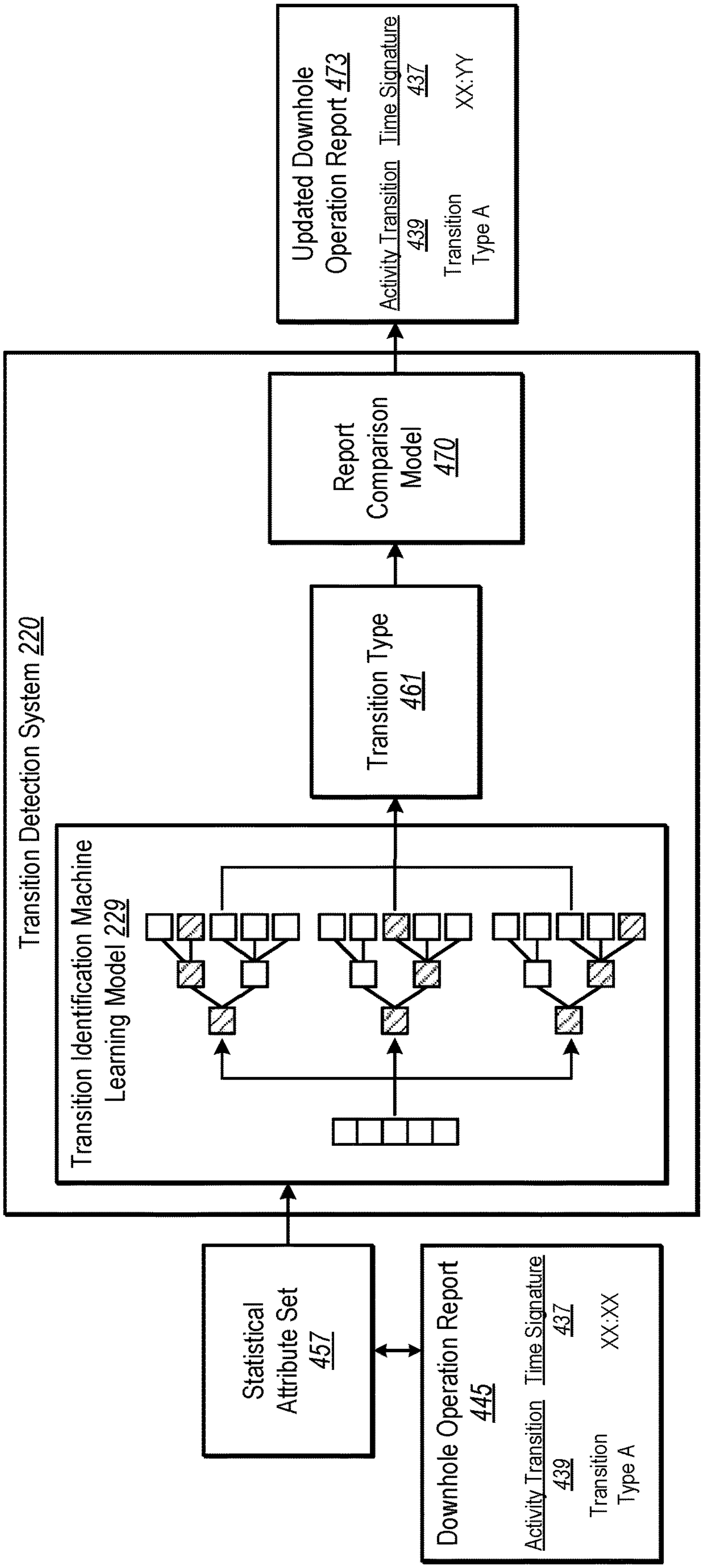

The machine learning manager 228 may execute the trained version of the transition identification machine learning model 229 based on wellbore measurement data 232 for a wellbore (or operation) of interest to identify transitions (and associated times) between activities in the wellbore measurement data 232. In this way, the transition detection system 220 may facilitate updating the downhole operation reports 234 to provide a more accurate overview of the various activities of a downhole operation. FIGS. 4A, 4B, and 4C illustrate the transition detection system 220 implementing the transition identification machine learning model 229 to determine or predict transition types.

While one or more embodiments described herein describe features and functionalities performed by specific components 222-228 of the transition detection system 220, specific features described in connection with one component of the transition detection system 220 may be performed by one or more of the other components of the transition detection system 220.

By way of example, one or more of the data receiving, gathering, or storing features of the data manager 222 may be delegated to other components of the transition detection system 220. As another example, while wellbore data time windows be generated by the time window manager 224, in some instances, some or all of these features may be performed by the statistical attribute manager 226 (or other component of the transition detection system 220). Indeed, it will be appreciated that some or all of the specific components may be combined into other components and specific functions may be performed by one or across multiple components 222-228 of the transition detection system 220.

Each of the components of the transition detection system 220 may be implemented in software, hardware, or both. For example, the components of the transition detection system 220 include instructions stored on a computer-readable storage medium and executable by at least one processor of one or more computing devices. When executed by the processor, the computer-executable instructions of the transition detection system 220 cause a computing device to perform the methods (e.g., computer-implemented methods) described herein. As another example, the components of the transition detection system include hardware, such as a special-purpose processing device to perform a certain function or group of functions. In some instances, the components of the transition detection system include a combination of computer-executable instructions and hardware.

Furthermore, the components of the transition detection system may be implemented as one or more operating systems, stand-alone applications, modules of an application, plug-ins, library functions, functions called by other applications, and/or cloud-computing models. Additionally, the components of the transition detection system may be implemented as one or more web-based applications hosted on a remote server and/or implemented within a suite of mobile device applications or "apps."

As mentioned above, the transition detection system 220 uses a transition identification machine learning model 229 to determine transition types. These transition types may indicate a change between two downhole operations or activities represented in wellbore measurement data. Accordingly, FIG. 3A illustrates an example block diagram of training a transition identification machine learning model to determine transition types for transitions between downhole activities.

As shown, FIG. 3A includes training data 360, the transition detection system 220 with a transition identification machine learning model 229, and a loss model 362. The training data 360 includes statistical attribute sets 356 and ground-truth transition types 358. In one or more implementations, the statistical attribute sets 356 are generated from wellbore measurement data 342. Additional details regarding generating the training data 360 are provided next in connection with FIG. 3B before returning to describe the operations shown in FIG. 3A FIG. 3B illustrates a block diagram example of generating training data from reference data, according to some implementations. The reference data 348 may include the wellbore measurement data 342 (e.g., time-series measurement data) and downhole operation reports 344. In some implementations, the reference data 348 may be associated or correlated with one or more reference wellbores, which may be offset wellbores or other wellbores for which the wellbore measurement data 342 and downhole operation reports 344 have already been collected. For example, the reference data 348 may be accessible through a wellbore database or library including information for many wellbores.

As shown, the transition detection system 220 includes a time window model 350 and a statistical attribute generation model 354. The transition detection system 220 may receive the reference data 348 and provide it to a time window model 350 to generate time window data 352. To explain, the time window model 350 may identify activity transitions 338 for an associated reference wellbore from downhole operation reports 344 along with time signatures 340 corresponding to the activity transitions 338. For each of the activity transitions 338 in the downhole operation reports 344, the time window model 350 may identify a corresponding time signature that establishes a time point 341. The time point 341 signals a transition time between downhole operations that occur at a wellbore (i.e., an activity transition).

The time point 341 may apply to multiple measurements and measurement data types included in the wellbore measurement data 342 for a wellbore. For example, a time point identified from the downhole operation reports 344 may indicate that an activity transition 338 occurred at a time signature of 11:15 AM. The time window model 350 may accordingly generate a time point 341 corresponding to 11:15 AM for each instance of the wellbore measurement data 342 (e.g., a flowrate, temperature, speed, tool status, etc.) to generate the time window data 352. In this way, the time point 341 may facilitate identifying and synchronizing a different types of measurements of a reference wellbore for the time window data 352.

In some implementations, the time window model 350 generates time windows 343 (e.g., window portions) to represent the time window data 352. The time windows 343 may correspond to the time point 341. For example, the time windows 343 may include a first time window before the time point 341 and a second time window after the time point 341. The time windows 343 may capture measurement data from the one or more measurement types that have measurement data occurring within one of the time windows 343. Additionally, for each time point, the transition detection system 220 may create an associated pair of time windows 343 (e.g., or a single time window having first and second portions).

The time windows 343 may be windows or intervals of time having a predefined length. For example, the time windows 343 may be intervals of 15 minutes, 30 minutes, 1 hour, 2 hours, 3 hours, 5 hours, or more. The time windows 343 may be of equal length or may be different lengths of time. In this way, the time window data 352 may include the wellbore measurement data 342 defined by the time point 341 and the time windows 343, while excluding other portions of the wellbore measurement data 342 not falling within the time windows 343.

In some embodiments, the transition detection system 220 generates statistical attribute sets 356 based on the reference data 348. For example, a statistical attribute generation model 354 may receive the time window data 352 and may determine or calculate various statistical calculations based on the time window data 352. The statistical attribute generation model 354 may determine a set of statistical attributes for each of the time windows 343 corresponding to each time point. In some implementations, for each time point, the statistical attribute generation model 354 may generate a first statistical attribute subset for the first time window and a second statistical attribute subset for the second time window. The statistical attribute sets 356 may include statistical attributes for any (or all) of the different measurement types of the wellbore measurement data 342 bounded by the time windows 343.

The statistical attribute sets 356 may include one or more statistical calculations or features of the underlying data bounded by the time windows 343. For example, the statistical attribute generation model 354 may determine an average, mean, median, mode, minimum, maximum, standard deviation, variance, quartile, peak, valley, or other statistical calculation of the wellbore measurement data. The statistical attribute sets 356 may include any attribute, value, feature, or calculation, and combinations thereof. In various implementations, the statistical attribute sets 356 includes 100, 200, or more distinct attributes or features that are identifiable in the wellbore measurement data 342, bounded by the time windows 343. In this way, the wellbore measurement data 342 is represented by statistical attributes that occur within a predetermined time of a known activity transition type.

The transition detection system 220 may generate the training data 360 based on the statistical attribute sets 356. For example, for each statistical attribute set (e.g., corresponding to a given time point and associated time windows), the transition detection system 220 may identify the corresponding activity transition from the downhole operation reports 344 and may associate or correlate the activity transition with the statistical attribute set as a ground-truth transition type. As shown, the training data 360 may include the statistical attribute sets 356 which may characterize a behavior, performance, or aspect of the wellbore at or around a given time point and ground-truth transition types 358 that identify the type of transition took place within the wellbore at the time point 341.

Returning back to FIG. 3A, the transition detection system 220 may train the transition identification machine learning model 229 using the training data 360. The transition identification machine learning model 229 may be trained to determine an estimated transition type 361 for a transition between downhole operations based on the statistical characterizations included in the training data 360. The transition identification machine learning model 229 is often trained offline but may be trained on the fly.

In various implementations, such as the one shown, the transition identification machine learning model 229 includes a tree-based architecture having one or more hierarchical, tree-like structures. In various instances, the transition identification machine learning model 229 is a decision tree model, a random forest or ensemble of decision trees, or a gradient boosting model.

To elaborate, in some instances, the transition identification machine learning model 229 is a tree-based model that includes a hierarchical structure of decision nodes, branches, and leaf nodes. Each node represents a decision based on a specific feature and each leaf represents a candidate transition type for which the transition identification machine learning model 229 may classify the statistical attribute sets 356. The tree-based structure is built through the recursive splitting of the decision nodes into further decision nodes through training of the transition identification machine learning model 229 as described below.

In some instances, the transition detection system 220 utilizes a leaf-based model for the transition identification machine learning model 229. A leaf-based model allows the transition detection system 220 to use unbalanced growth and/or splitting among nodes to minimize losses of nodes. In various implementations, the transition detection system 220 implements a light gradient boosting machine architecture (LGBM or LightGBM) along with the leaf-based model. For example, the transition detection system 220 uses an LGBM classifier to identify transition types between downhole operations.

In various implementations, the transition detection system 220 processes each input statistical attribute set and generates an input feature vector or a dimensional array containing numerical values each representing one of the various attributes of a statistical attribute set. The transition identification machine learning model 229 then processes the feature vector through a sequence of decision nodes, where the transition identification machine learning model 229 evaluates a specific feature of the input vector and makes a decision based on the feature's value. In this way, the transition identification machine learning model 229 recursively navigates through the tree structure making decisions at each node based on different features until a leaf node is reached, providing the final output prediction of an estimated transition type 361.

In some embodiments, the transition identification machine learning model 229 includes an ensemble architecture that utilizes multiple decision trees. For example, the transition identification machine learning model 229 may process the input vector through separate decision trees independently. The outputs are then combined, such as through voting or averaging, to generate a final ensemble prediction of the estimated transition type 361.

In some embodiments, the transition identification machine learning model 229 may determine a probability or confidence of the estimated transition type 361. For example, the probability may be determined based on the voting of the various trees, based on a logistic function such as a LGBM classifier, through calibration techniques such as Platt scaling or isotonic regression, or any other suitable technique for determining multi-classification probabilities.

In implementations where the transition identification machine learning model 229 determines several of the candidate transition types as possible outputs, the transition identification machine learning model 229 may determine a confidence or probability of each of these possibilities (or all of the candidate transition types). The estimated transition type 361 may be determined by the transition identification machine learning model 229 based on having a highest probability among the candidate transition types.

As mentioned, the transition identification machine learning model 229 may not converge to a single candidate transition type but may return several candidate transition types as possible outputs for a given time point of the training data 360. In some implementations, the transition identification machine learning model 229 may combine the several candidate transition type predictions, such as through voting or averaging, to generate a final ensemble prediction of the estimated transition type 361 to determine an estimated transition type.

In some embodiments, the transition identification machine learning model 229 may output a null transition type indicating that no downhole operation transition took place at an associated time point of the training data 360. For example, the transition identification machine learning model 229 may be trained to output the null transition type based on each of the candidate transition types having a probability below a transition threshold value.

In some implementations, the transition identification machine learning model 229 is implemented as another type of machine learning model, such as a neural network architecture. For example, the transition identification machine learning model 229 may be a Monte Carlo Dropout prediction model, a U-Net neural network, or a U-Net++ neural network.

As mentioned above, the transition detection system 220 may train the transition identification machine learning model 229 based on the training data 360. For example, the transition detection system 220 may provide the statistical attribute sets 356 for a given time point to the transition identification machine learning model 229, and the transition identification machine learning model 229 may predict or determine an estimated transition type for the given time point. The estimated transition type along with the ground-truth transition type for the time point may be provided to the loss model 362 to evaluate the performance of the transition identification machine learning model 229 during the training process.

In various implementations, the loss model 362 implements or more loss functions or techniques such as cross-entropy loss, Gini impurity, deviance, etc. to determine and estimated transition type error amount. In various implementations, the transition detection system 220 provides the error or loss amount back to the transition identification machine learning model 229 as label feedback 364 to train and fine-tune the transition identification machine learning model.

Additionally, in one or more implementations, the transition detection system 220 uses the label feedback 364 to train, optimize, and/or fine-tune the decision tree(s) of the transition identification machine learning model 229 through techniques such as recursive partitioning and/or boosting. For example, the transition detection system 220 uses the loss model 362 to facilitate selecting a feature and corresponding threshold for separating the statistical attribute sets 356 into homogeneous subsets and generating or splitting corresponding decision nodes to generate one or more decision trees.

As another example, the transition detection system 220 uses the loss model 362 to facilitate generating trees sequentially, with each tree correcting the errors of the previous tree. The transition detection system 220 may iteratively train the transition identification machine learning model 229 in this way with respect to many time points of the training data 360 to further fine-tune the transition identification machine learning model 229 for a set number of iterations, until it converges, until the training data is exhausted, or until a satisfactory level of accuracy is otherwise achieved.

As described earlier, in some embodiments, the transition detection system 220 generates training data 360 that includes statistical attribute sets 356 generated by the transition detection system 220 for various time points 341 and time windows 343 in relation to the wellbore measurement data 342. In one or more implementations, the transition detection system 220 does not generate or does not use the statistical attribute sets with the transition identification machine learning model. In these implementations, the transition detection system 220 trains the transition identification machine learning model 229 directly based on the wellbore measurement data 342 (e.g., raw or processed time-series data). For example, the transition detection system 220 provides the wellbore measurement data 342 from one or more data sources directly to the transition identification machine learning model 229 rather than pre-processing the measurement data into a statistical attribute set.

To elaborate, in various implementations, the transition identification machine learning model is trained to determine an estimated transition type 361 for a transition between downhole operations based on the identifying patterns, relationships, statistical characterizations, and other attributes directly from the wellbore measurement data 342. In some cases, the transition detection system 220 may generate an input feature vector representing these various features identified from the wellbore measurement data 342 and may process the input feature vector through the series of nodes of the transition identification machine learning model to determine transition types and/or transition times.

In these implementations, the transition identification machine learning model may recursively process the wellbore measurement data as input through the tree and leaf architecture to provide a final output prediction of an estimated transition type 361. Then, the transition detection system 220 may use the loss model 362 to fine-tune the predictions of the transition identification machine learning model. In this way, the transition identification machine learning model 229 may be trained to predict transition types for an operation of a wellbore based on measurement data from the wellbore.

Once trained, in various implementations, the transition detection system 220 uses the transition identification machine learning model 229 to automatically generate transition types for an operation of a wellbore of interest for which downhole transition types and/or time signatures may not be known or verified. To illustrate, FIG. 4A shows an example block diagram of generating input data from sample data for applying to the transition identification machine learning model according to various implementations. FIGS. 4B-4C illustrate example block diagrams of using a transition detection system 220 to generate estimated transition times according to some embodiments.

As shown in FIG. 4A, the transition detection system 220 executes the transition identification machine learning model 229 to generate statistical attribute sets 456. As illustrated, the transition detection system 220 generates the statistical attribute sets 456 based on wellbore measurement data 442, which is part of a wellbore data 462 for a subject wellbore. In some implementations, the wellbore data 462 is associated or correlated with one or more operations within a subject wellbore, or a wellbore of interest. In another example, the wellbore data 462 may be associated with a specific downhole operation (e.g., a collection of downhole activities) of interest of a wellbore.

In some cases, the wellbore data 462 may be associated with corresponding operation reports for the subject wellbore including, for example, activity transitions and time signatures similar to corresponding elements described above in connection with FIG. 3B. In some instances, one or more activity transitions and/or associated time signatures of these downhole operation reports may not be known, may be incorrect, or may otherwise need verifying. In these instances, the transition detection system 220 may generate the statistical attribute sets 456 based on the wellbore measurement data 442 to serve as an input for the transition identification machine learning model 229, which determines one or more wellbore operation transition types and transition times (described below), where the transition detection system 220 uses the determined transition types and transition times to verify (or add) entries the downhole operation reports.

As shown, the transition detection system 220 includes a time window model 450 and a statistical attribute generation model 454. In some implementations, the time window model 450 generates time window data 452 based on the wellbore measurement data 442. For example, the time window model 450 may determine one or more (e.g., often several) time points 441. The time window model 450 may generate the time points 441 according to a rolling time interval throughout the wellbore measurement data 442. For example, the time window model 450 may generate a time point for every 5 minutes, 10 minutes, 15 minutes, 30 minutes, 1 hour, or other rolling time interval of the wellbore measurement data 442. Thus, the time window model 450 may generate time points that may span some or all of the wellbore measurement data 442. As shown in FIG. 4A, the time window model 450 generates three different instances of the time points 441 within the time window data 452 labeled as "A," "B," and "C."

The rolling interval nature of the time points 441 differs from the time point 341 described above with FIG. 3B that is used to generate the training data 360. As described above in FIG. 3B, the time point 341 is determined based on an associated time signature indicated in the downhole operation reports 344. However, the time window model 450 may not have reliable time signatures available. Accordingly, the time window model 450 employs a series of time points at designated intervals to detect when transitions occur at the subject wellbore based on the wellbore measurement data 442.

In some implementations, the time window model 450 generates time windows 443 in the time window data 452. The time windows 443 may correspond to the time points 441. For example, for each time point, the time window model 450 may determine a first time window before the time point and a second time window after the time point. In some cases, for the same time point, the time window model 450 may generate separate instances of the time windows for different measurement types. In other cases, the time window model 450 combines the different measurement types in the same time window In any case, each of the time points 441 may include an associated pair of time windows 443. In some implementations, the time window model 450 generates a single time window that includes the first and second portions described above.

The time windows 443 may be windows or intervals of time having any predefined length, such as that discussed above in connection with the training data. In an example, both of the time windows 443 may be 1 hour in length each such that the time windows 443 span from 1 hour before a time point to 1 hour after the time point. In some examples, the time windows 443 may be different lengths, including different lengths for each of the time windows 443 in a pair of time windows 443 corresponding to a given time point.

As shown, the transition detection system 220 determines the statistical attribute sets 456 based on the wellbore measurement data 442 for a wellbore. As described above, the statistical attribute sets 456 may include any of a variety of statistical calculations or features. The statistical attribute generation model 454 may generate a set of statistical attributes for each time point indicated in the time window data 452. In particular, the statistical attribute generation model 454 generates a statistical attribute set for each segmented section of the wellbore measurement data 442 represented in the time window data 452 by the time points 441. For example, for each time point, the statistical attribute generation model 454 may determine a first statistical attribute subset ("Set A") for the first time window of a first time point ("Time Point A"). The statistical attribute generation model 454 may similarly generate a second statistical attribute subset ("Set B") for a the second time window of a second time point ("Time Point B").

As noted above, the statistical attribute sets 456 may include statistical characterizations for various type of measurement data included in the wellbore measurement data 442 for a given time point. For example, for a given time point, a statistical attribute set may include features such as a mean, minimum, maximum, standard deviation, etc. for a fluid flow rate (e.g., for both the before and after time windows), and may also indicate a mean, minimum, maximum, standard deviation, etc. for a temperature, pressure, speed, torque, or any other measurement at the associated time point. In this way, the statistical attribute sets 456 provides a robust statistical and temporal characterization of each timepoint through for one or more measurement types (or a combination of measurement types) that describe many different properties of a downhole operation, which the transition detection system 220 uses to determine when downhole operation transitions occur.

As shown in FIGS. 4B-4C, the transition detection system 220 includes the transition identification machine learning model 229. In these figures, the transition identification machine learning model 229 represents a trained decision tree model with tuned weights and parameters and other trained components. The transition identification machine learning model 229 generates a transition type 461 from a statistical attribute set 457 (or a set of statistical attribute sets). 470

In particular, in FIG. 4B, the transition detection system 220 uses the transition identification machine learning model 229 to generate a transition type 461 from a statistical attribute set 457. The transition types 461 in this way may facilitate characterizing, based on measurement data from a wellbore of interest, the various downhole activity types, and transitions therebetween, for a downhole operation of the wellbore of interest. Additionally, the transition detection system 220 may provide each of the statistical attribute sets 456 (FIG. 4A) for the time points 441 to the transition identification machine learning model 229 to determine whether (and what type) of downhole operation transition occurred at each of the time points 441.

As mentioned above, the transition detection system 220 may train the transition identification machine learning model 229 based solely on wellbore measurement data (e.g., raw or processed time-series data). Accordingly, in some embodiments, the transition detection system 220 uses the transition identification machine learning model 229 to determine the transition type 461 using wellbore measurement data as an input. In some cases, determining transition types based on wellbore measurement data, instead of statistical attribute sets for example, may simplify and streamline the transition type prediction process by eliminating the need to pre-process the wellbore measurement data and generate the statistical attribute sets.

In some embodiments, the transition detection system 220 compares the transition types 461 to corresponding activity transitions for the wellbore as indicated in the downhole operation reports. To elaborate, FIG. 4C expands upon FIG. 4B by adding a report comparison model 470 for generating an updated downhole operation report 473 (e.g., automatically report updates without needing user interaction). As shown in FIG. 4C, the report comparison model 470 may compare an activity transitions 439 and an associated time signatures 437 of a downhole operation report 445 to the transition type 461 predicted by the transition identification machine learning model 229.

In some instances, the report comparison model 470 may identify one or more instances (e.g., one or more time points) where activity transitions and/or time signatures of the downhole operation reports differ from that indicated in the determined transition types. For example, the downhole operation reports may indicate that an activity transition of a specific type occurs at a time signature, and the transition types predicted by the transition identification machine learning model 229 indicate a different type of activity transition for the associated time signature. In another example, the downhole operation reports may indicate that an activity transition of a specific type occurs at a time signature and the transition types predicted by the transition identification machine learning model 229 indicate that the activity transition of that specific type occurred at a different time signature.

In various implementations, based on identifying discrepancies between the downhole operation reports and the estimated transition types, the transition detection system 220 updates a downhole operation report. For example, based on a comparison performed by the report comparison model 470 between the downhole operation report 445 and the transition type 461, the transition detection system 220 generates an updated downhole operation report 473, which may include indications of transition discrepancies of the downhole operation report 445 and the statistical attribute set 457. In some implementations, the report comparison model 470 may provide a flag, alert, or may otherwise indicate the discrepancies to downhole personnel for review.

In some embodiments, the transition detection system 220 may automatically update the downhole operation report 445. For example, based on the report comparison model 470, the transition detection system 220 may update or correct the activity transition 439 and/or the associated time signature437 in the updated downhole operation reports 473. In various implementations, the transition detection system 220 automatically updates a downhole operation report of a wellbore to indicate the determined transition of the transition type within the time window and/or time signature.

In some embodiments, the report comparison model 470 may update one or more of these values based on a probability threshold of an associated transition type. For example, if the transition identification machine learning model 229 determines a transition type 461 with a probability or confidence above the threshold value, the transition detection system 220 automatically corrects the associated value in the updated downhole operation reports if the value differs from what is indicated in the downhole operation report. In another example, the transition detection system 220 may not update or change a value in a downhole operation reports if the associated transition type is at or below a threshold value and may instead flag or alert to the discrepancy.

As described above, the transition detection system 220 may be implemented to identify times and types of downhole activity transitions for a downhole operation of interest based on measurement data for the downhole operation. By used the transition identification machine learning model, the transition detection system 220 provides a more accurate and reliable characterization of the downhole operation over that of a conventional downhole operation report, which may be flawed, include errors, or otherwise be inaccurate.

Figure 5A:
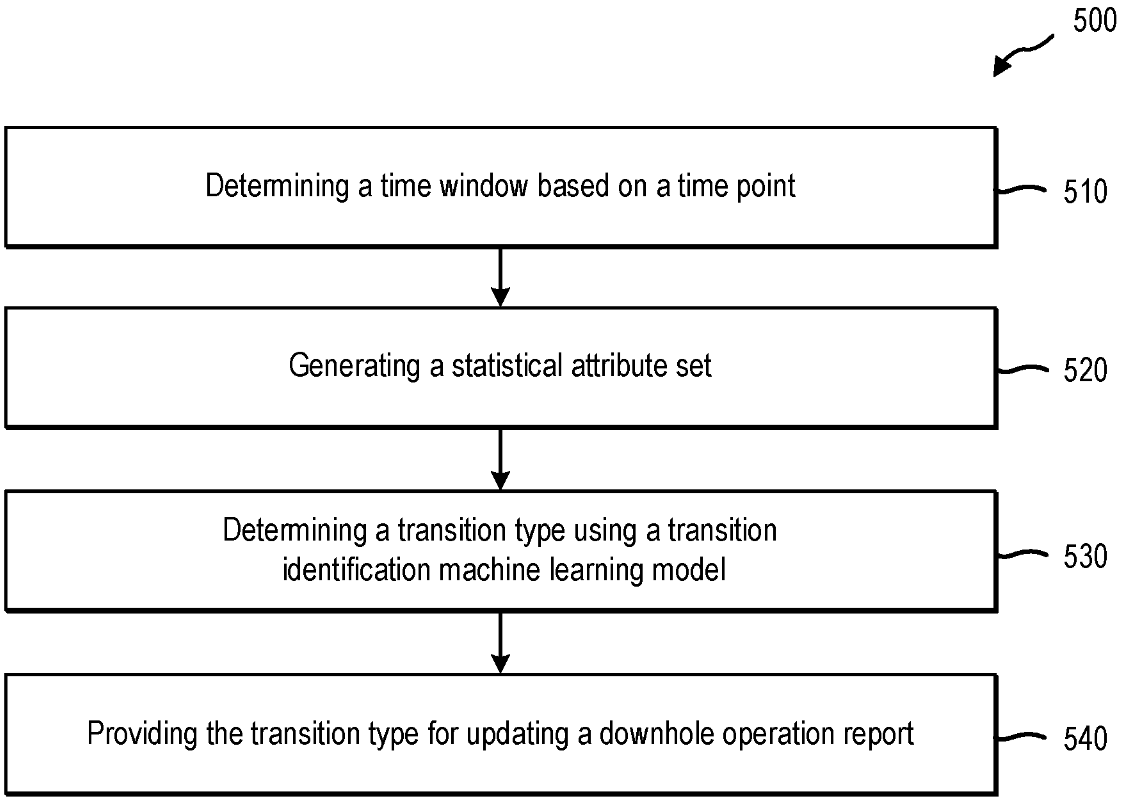
FIG. 5A illustrates an example flowchart that includes a series of acts in a computer-implemented method for determining transitions in downhole operations according to some implementations.
Figure 5B:
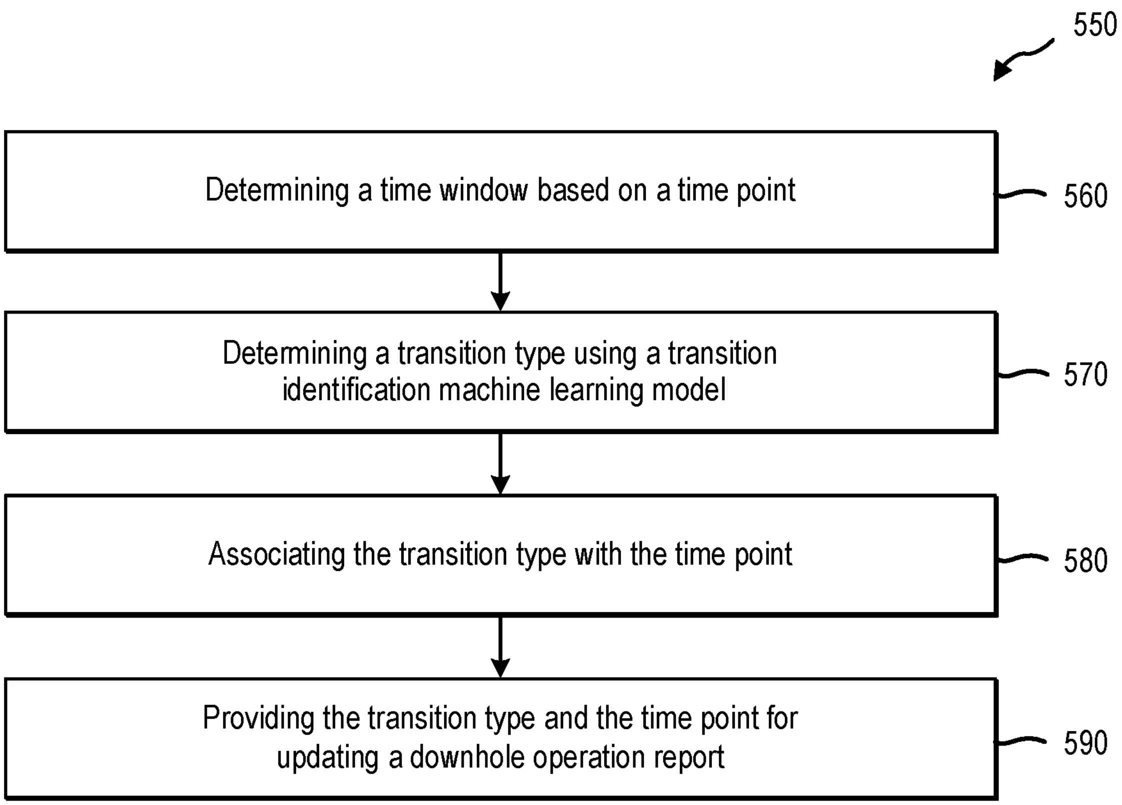
FIG. 5B illustrates an example flowchart that includes a series of acts in a computer-implemented method for determining transitions in downhole operations according to some implementations.

Now turning to FIGS. 5A-5B, each of these figures illustrates an example flowchart that includes a series of acts in a computer-implemented method for determining transitions in downhole operations according to some implementations. In particular, both FIGS. 5A-5B illustrate an example series of acts representing a computer-implemented method for determining a transition type between downhole operations using a transition identification machine learning model.

While FIGS. 5A-5B each illustrates a series of acts representing a computer-implemented method according to one or more implementations, alternative implementations may omit, add to, reorder, and/or modify any of the acts shown. Furthermore, the acts of FIGS. 5A-5B may be performed as part of a method (e.g., a computer-implemented method). Alternatively, a computer-readable medium may include instructions that, when executed by a processing system with a processor, cause a computing device to perform the acts of FIGS. 5A-5B.

In some implementations, a system (e.g., a processing system including a processor) may perform the acts of FIGS.

5A-5B. For example, the acts include a system that includes a processing system and computer memory including instructions that, when executed by the processing system, cause the system to perform various actions or steps.

Turning now to FIG. 5A, this figure includes a series of act 500, with an act 510 of determining a time window based on a time point. For instance, in example implementations, the act 510 involves determining a time window based on a time point within wellbore data measured for a wellbore.

As further shown, the series of acts 500 includes an act 520 of generating a statistical attribute set. For instance, in example implementations, the act 520 involves generating, from the wellbore data, a statistical attribute set for the time window.

As further shown, the series of acts 500 includes an act 530 of determining a transition type using a transition identification machine learning model. For instance, in example implementations, the act 530 involves determining, for the time window, a transition type for a transition between downhole operations using a transition identification machine learning model based on the statistical attribute set for the time window. In various implementations, the series of acts 500 omits or skips the act 530.

As further shown, the series of acts 500 includes an act 540 of providing the transition type for updating a downhole operation report. For instance, in example implementations, the act 540 involves automatically updating a downhole operation report of the wellbore to indicate the transition of the transition type within the time window based on determining the transition type within the time window using the transition identification machine learning model. In some instances, the act 540 includes providing the transition type associated with the time point for the transition between the downhole operations for updating a downhole operation report for the wellbore. In some embodiments, the act 540 includes updating an operation report of the wellbore with the time signature of the transition type. In various implementations, updating the operation report of the wellbore occurs automatically, without user input or interaction with the operation report within the time window.

In some cases, the series of acts 500 includes generating the statistical attribute set is based on measurement data associated with the downhole operations for the wellbore. In some cases, the series of acts 500 includes generating the statistical attribute set is based on different measurement data types measured for the wellbore. In some cases, the measurement data includes time-series measurement data from one or more downhole sensors or one or more surface sensors.

In some cases, the series of acts 500 includes identifying the transition type at a time signature within the downhole operation report and updating the time signature for the transition type in the downhole operation report to correspond with the time point. In some cases, the series of acts 500 includes generating the statistical attribute set based on determining one or more of a mean, median, maximum, minimum, and standard deviation based on the time window for the time point. In some cases, the series of acts 500 includes generating the statistical attribute set based on generating a first statistical attribute subset for a first portion of the time window before the time point and a second statistical attribute subset for a second portion of the time window after the time point.

In some cases, the transition identification machine learning model determines the transition type by classifying the time window for the time point based on a group of candidate transition types, and the transition type is selected based on having the highest probability among the group of candidate transition types. In some cases, the group of candidate transition types includes a null transition type indicating no transition of the downhole operations, and the transition identification machine learning model determines the null transition type when no downhole operation transitions occur within a given window. In some cases, the transition identification machine learning model determines the null transition type for a given time window based on determining that a transition probability for the given time window is below a transition threshold value.

In some cases, the transition identification machine learning model uses a decision leaf-based architecture to determine the transition type. In some cases, the series of acts 500 includes training the transition identification machine learning model by comparing transition types determined from measured wellbore data for a set of time windows to corresponding reported transition types reported for time signatures within the set of time windows.

In some cases, the series of acts 500 includes generating training data for the transition identification machine learning model based on receiving downhole operation reports of downhole operations for a set of reference wellbores, based on receiving one or more sets of wellbore measurement data for the set of reference wellbores, based on associating or correlating the downhole operation reports with the one or more sets of wellbore measurement data based on time windows, and based on generating labeled training data by combining correlated transition types with the one or more sets of wellbore measurement data based on time signatures of downhole operation transition times from the downhole operation reports.

In some cases, the series of acts 500 includes generating a statistical attribute set for each time window in the set of time windows from wellbore measurement data associated with the downhole operations for the wellbore, and providing statistical attribute sets for time windows to the transition identification machine learning model to determine the transition types.

Turning now to FIG. 5B, this figure includes a series of acts 550 having the act 560 determining a time window based on a time point. For instance, in example implementations, the act 560 involves determining a time window based on a time point within wellbore data measured for a wellbore.

As further shown, the series of acts 550 includes an act 570 of determining a transition type using a transition identification machine learning model. For instance, in example implementations, the act 570 involves determining a transition type within the time window for a transition between downhole operations of the wellbore using a transition identification machine learning model based on the wellbore data.

As further shown, the series of acts 550 includes an act 580 of associating the transition type with the time point. For instance, in example implementations, the act 580 involves associating the transition type with the time point based on determining the transition type within the time window.

As further shown, the series of acts 550 includes an act 590 of providing the transition type and the time point for updating a downhole operation report. For instance, in example implementations, the act 590 involves providing the transition type and the time point for updating a time signature of the transition type within a downhole operation report of the wellbore.

In some cases, the transition identification machine learning model determines the transition type based on time-series measurement data of a plurality of different measurement data types measured for the downhole operations for the wellbore. In some cases, the transition identification machine learning model determines the transition type by classifying the time window for the time point based on a group of candidate transition types, and the transition type is selected based on having a highest probability among the group of candidate transition types.

Figure 6:
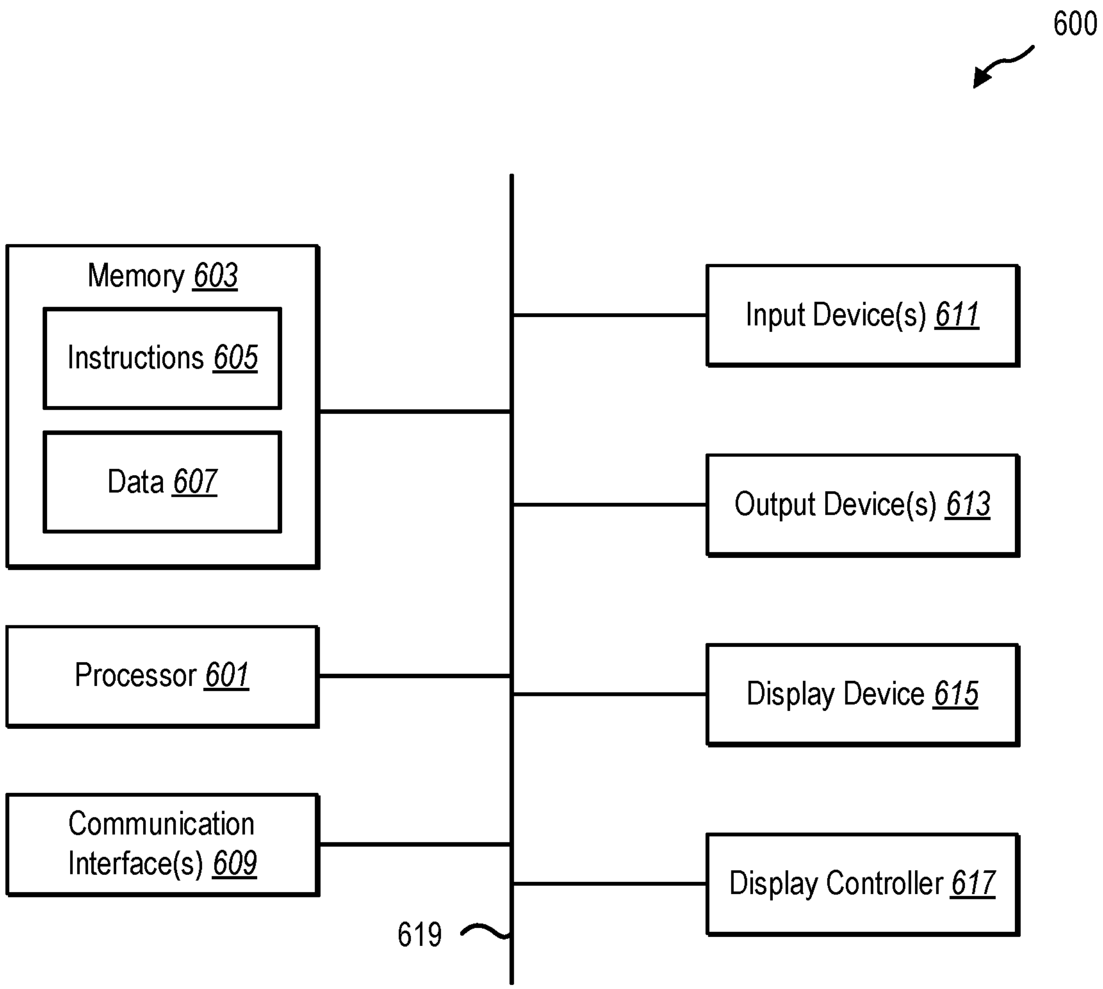
FIG. 6 illustrates certain components that may be included within a computing system to implement the transition detection system.

Turning now to FIG. 6, this figure illustrates certain components that may be included within a computer system 600. One or more computer systems may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor is shown in the computer system 600 of FIG. 6, in an alternative configuration, a combination of processors (e.g., an ARM and DSP) could be used.

The computer system 600 also includes memory 603 in electronic communication with the processor 601. The memory 603 may include computer-readable storage media and may be any available media that may be accessed by a general purpose or special purpose computer system. Computer-readable media that store computer-executable instructions are non-transitory computer-readable media (device). Computer-readable media that carry computer-executable instructions are transmission media. Thus, by way of example and not limitations, embodiment of the present disclosure may include at least two distinctly different kinds of computer-readable media: non-transitory computer-readable media (devices) and transmission media.

Both non-transitory computer-readable media (devices) and transmission media may be used temporarily to store or carry software instructions in the form of computer readable program code that allows performance of embodiments of the present disclosure. Non-transitory computer-readable media may further be used to persistently or permanently store such software instructions. Examples of non-transitory computer-readable storage media include physical memory (e.g., RAM, ROM, EPROM, EEPROM, etc.), optical disk storage (e.g., CD, DVD, HDDVD, Blu-ray, etc.), storage devices (e.g., magnetic disk storage, tape storage, diskette, etc.), flash or other solid-state storage or memory, or any other non-transmission medium which may be used to store program code in the form of computer-executable instructions or data structures and which may be accessed by a general purpose or special purpose computer, whether such program code is stored or in software, hardware, firmware, or combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The one or more communication interfaces 609 may be based on wired communication technology, wireless communication technology, or both. Some examples of communication interfaces include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

The one or more communication interfaces 609 may connect the computer system 600 to a network. A "network" or "communications network" may generally be defined as one or more data links that enable the transport of electronic data between computer systems and/or modules, engines, or other electronic devices, or combinations thereof. When information is transferred or provided over a communication network or another communications connection (either hardwired, wireless, or a combination of hardwired or wireless) to a computing device, the computing device properly views the connection as a transmission medium. Transmission media may include a communication network and/or data links, carrier waves, wireless signals, and the like, which may be used to carry desired program or template code means or instructions in the form of computer-executable instruction or data structures and which may be accessed by a general purpose or special purpose computer.

A computer system 600 may also include one or more input devices 611 and one or more output devices 613. Some examples of input devices include a keyboard, mouse, microphone, remote control device, button, joystick, trackball, touchpad, and lightpen. Some examples of output devices include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into one or more of text, graphics, or moving images (as appropriate) shown on the display device 615.

The various components of the computer system 600 may be coupled together by one or more buses, which may include one or more of a power bus, a control signal bus, a status signal bus, a data bus, other similar components, or combinations thereof. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods (e.g., computer-implemented methods) described herein. The instructions may be organized into routines, programs, objects, components, data structures, etc., which may perform particular tasks and/or implement particular data types, and which may be combined or distributed as desired in various embodiments.

Further, upon reaching various computer system components, program code in the form of computer-executable instructions or data structures may be transferred automatically or manually from transmission media to non-transitory computer-readable storage media (or vice versa). For example, computer executable instructions or data structures received over a network or data link may be buffered in memory (e.g., RAM) within a network interface module (NIC), and then eventually transferred to computer system RAM and/or to less volatile non-transitory computer-readable storage media at a computer system. Thus, it should be understood that non-transitory computer-readable storage media may be included in computer system components that also (or even primarily) utilize transmission media.

The embodiments of the transition detection system have been primarily described with reference to wellbore drilling operations; the transition detection system described herein may be used in applications other than the drilling of a wellbore. In other embodiments, the transition detection system according to the present disclosure may be used outside a wellbore or other downhole environment used for the exploration or production of natural resources. For instance, the transition detection system of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method for determining transitions in downhole operations, comprising:

performing a downhole sequence for a wellbore, the downhole sequence including a first downhole operation and a second downhole operation with a first transition between the first downhole operation and the second downhole operation;

measuring, by one or more downhole sensors or one or more surface sensors during the downhole sequence, time-series wellbore data for the downhole sequence of the wellbore;

identifying, in a downhole operation report for the wellbore, the first downhole operation, the second downhole operation, and a reported time signature for the first transition, wherein the reported time signature is inaccurate relative to an actual time signature when the first transition occurred between performance of the first downhole operation and performance of the second downhole operation in the downhole sequence for the wellbore;

determining a plurality of time points within the time-series wellbore data and a plurality of time windows around the plurality of time points, wherein each time window of the plurality of time windows corresponds to a time point of the plurality of time points and includes, for the time point of the plurality of time points, a first portion before the time point of the plurality of time points and a second portion after the time point of the plurality of time points;

for each time point of the plurality of time points, generating, from the time-series wellbore data, a statistical attribute set for a corresponding time window of the plurality of time windows, the statistical attribute set including a first statistical attribute subset for the first portion of the corresponding time window and a second statistical attribute subset for the second portion of the corresponding time window;

for each time point of the plurality of time points, predicting a transition type at the time point using a transition identification machine learning model, the statistical attribute set for the corresponding time window being input to the transition identification machine learning model, the transition identification machine learning model having been trained to classify transitions between downhole operations based on statistical attributes of wellbore data at time windows around transition times;

identifying, from the transition types for the plurality of time points, a predicted transition type corresponding to the first transition between the first downhole operation and the second downhole operation at a predicted time point with a predicted time signature; and in response to determining that the reported time signature for the first transition between the first downhole operation and the second downhole operation differs from the predicted time signature, updating the reported time signature in the downhole operation report to the predicted time signature to reconcile the reported time signature for the first transition with the actual time signature at which the first transition occurred based on the time-series wellbore data for the downhole sequence.

2. The computer-implemented method of claim 1, wherein generating the statistical attribute set for each time point of the plurality of time points is based on measurement data associated with the downhole operations for the wellbore.

3. The computer-implemented method of claim 2, wherein generating the statistical attribute set for each time point of the plurality of time points is based on different measurement data types measured for the wellbore.

4. The computer-implemented method of claim 1, wherein:

the transition identification machine learning model determines the transition types by classifying the corresponding time windows for the plurality of time points based on a group of candidate transition types; and the predicted transition type corresponding to the first transition is selected based on having a highest probability among the group of candidate transition types.

5. The computer-implemented method of claim 4, wherein:

the group of candidate transition types includes a null transition type indicating no transition of the downhole operations; and the transition identification machine learning model determines the null transition type when no downhole operation transitions occur within a one of the corresponding time windows for one of the plurality of time points.

6. The computer-implemented method of claim 5, wherein the transition identification machine learning model determines the null transition type for one of the corresponding time windows for one time point of the plurality of time points based on determining that a transition probability for the one of the corresponding time windows is below a transition threshold value.

7. The computer-implemented method of claim 1, further comprising generating training data for the transition identification machine learning model based on:

receiving downhole operation reports of downhole operations for a set of reference wellbores;

receiving one or more sets of wellbore measurement data for the set of reference wellbores;

correlating the downhole operation reports with the one or more sets of wellbore measurement data based on time windows; and generating the training data by combining correlated transition types with the one or more sets of wellbore measurement data based on time signatures of downhole operation transition times from the downhole operation reports.

8. The computer-implemented method of claim 7, further comprising:

for a set of time windows around time points in the one or more sets of wellbore measurement data for the set of reference wellbores, generating a statistical attribute set for each time window in the set of time windows;

providing the statistical attribute sets for the set of time windows to the transition identification machine learning model to determine transition types for the time points; and comparing the determined transition types for the time points to the correlated transition types to train the transition identification machine learning model.

9. The computer-implemented method of claim 1, wherein generating the statistical attribute set for each time point of the plurality of time points includes determining one or more of a mean, median, maximum, minimum, or standard deviation based on the time window for the time point of the plurality of time points.

10. The computer-implemented method of claim 1, wherein the transition identification machine learning model uses a decision leaf-based architecture to determine the predicted transition type.

11. The method of claim 1, further comprising training the transition identification machine learning model using statistical attribute sets generated from time windows around time points in reference time-series wellbore data as training samples to predict transition types for the time points, and comparing the predicted transition types to corresponding ground-truth transition types for the time points.

12. A system, comprising:

a processor;

memory in electronic communication with the processor; and instructions stored in the memory, the instructions being executable by the processor to:

perform a downhole sequence for a wellbore, the downhole sequence including a first downhole operation and a second downhole operation with a first transition between the first downhole operation and the second downhole operation;

measure, by one or more downhole sensors or one or more surface sensors during the downhole sequence, time-series wellbore data for the downhole sequence of the wellbore;

identify, in a downhole operation report for the wellbore, the first downhole operation, the second downhole operation, and a reported time signature for the first transition, wherein the reported time signature is inaccurate relative to an actual time signature when the first transition occurred between performance of the first downhole operation and performance of the second downhole operation in the downhole sequence for the wellbore;

determine a plurality of time points within the time-series wellbore data and a plurality of corresponding time windows around the plurality of time points, wherein each time window of the plurality of corresponding time windows corresponds to a time point of the plurality of time points and includes, for the time point of the plurality of time points, a first portion before the time point of the plurality of time points and a second portion after the time point of the plurality of time points;

for each time point of the plurality of time points, generate, from the time-series wellbore data, a statistical attribute set for a corresponding time window of the plurality of corresponding time windows, the statistical attribute set including a first statistical attribute subset for the first portion of the corresponding time window and a second statistical attribute set for the second portion of the corresponding time window;

for each time point of the plurality of time points, predict a transition type at the time point using a transition identification machine learning model, the statistical attribute set for the corresponding time window being input to the transition identification machine learning model, the transition identification machine learning model having been trained to classify transitions between operations based on statistical attributes of wellbore data at time windows around transition times;

identify, from the transition types for the plurality of time points, a predicted transition type corresponding to the first transition between the first downhole operation and the second downhole operation at a predicted time point with a predicted time signature; and in response to determining that the reported time signature for the first transition between the first downhole operation and the second downhole operation differs from the predicted time signature, update the reported time signature in the downhole operation report to the predicted time signature to reconcile the reported time signature for the first transition with the actual time signature at which the first transition occurred based on the time-series wellbore data for the downhole sequence.

13. A computer-implemented method for determining transitions in downhole operations, comprising:

receiving reference time-series wellbore data measured for a set of reference wellbores;

receiving reference downhole operation reports for the set of reference wellbores;

identifying, from the reference downhole operation reports, reference time points corresponding to reference transitions between downhole operations in the set of reference wellbores;

determining reference time windows around the reference time points in the reference time-series wellbore data;

generating, from the reference time-series wellbore data, reference statistical attribute sets for the reference time windows;

labeling the reference statistical attribute sets corresponding to the reference time points with corresponding ground-truth transition types from the reference downhole operation reports to create training data samples;

training a transition identification machine learning model using the training data samples to predict transition types for the reference time points, including comparing predicted transition types for the reference time points to the corresponding ground-truth transition types for the reference time points;

receiving time-series wellbore data measured for a downhole sequence in a wellbore by one or more downhole sensors or one or more surface sensors, the downhole sequence including a first downhole operation, a second downhole operation, and a first transition between the first downhole operation and the second downhole operation;

identifying, in a downhole operation report for the wellbore, a reported time signature for the first transition between the first downhole operation and the second downhole operation, wherein the reported time signature is inaccurate relative to an actual time signature at which the first transition occurred between the first downhole operation and the second downhole operation in the downhole sequence for the wellbore;

determining a plurality of time points within the time-series wellbore data and a plurality of corresponding time windows around the plurality of time points, wherein each time window of the plurality of time windows corresponds to a time point of the plurality of time points and includes, for a time point of the plurality of time points, a first portion before the time point of the plurality of time points and a second portion after the time point of the plurality of time points;

for each time point of the plurality of time points, generating, from the time-series wellbore data, a statistical attribute set for a corresponding time window of the plurality of time windows, the statistical attribute set including a first statistical attribute subset for the first portion of the corresponding time window and a second statistical attribute subset for the second portion of the corresponding time window;

for each time point of the plurality of time points, predicting a transition type at the time point using the transition identification machine learning model, the statistical attribute set for the corresponding time window being input to the transition identification machine learning model;

identifying, from the transition types for the plurality of time points, a predicted transition type corresponding to the first transition between the first downhole operation and the second downhole operation at a predicted time point with a predicted time signature; and in response to determining that the reported time signature for the first transition differs from the predicted time signature, updating the reported time signature in the downhole operation report to the predicted time signature to reconcile the reported time signature with the actual time signature at which the first transition occurred, based on the time-series wellbore data for the wellbore.

* * * * *